United States Patent [19]

Hiscoe

[11] 4,030,619

[45] June 21, 1977

[54] APPARATUS AND METHOD FOR STACKING ROLLS OF PRESSURE SENSITIVE TAPE

[75] Inventor: Ernest C. Hiscoe, Hudson, N.H.

[73] Assignee: Nashua Corporation, Nashua, N.H.

[22] Filed: Oct. 14, 1975

[21] Appl. No.: 622,155

[52] U.S. Cl. .............................. 214/6 M; 53/157; 221/93; 214/8
[51] Int. Cl.² .................................... B65G 57/16
[58] Field of Search .......... 14/6 M, 8, 6 F; 53/157; 221/93; 206/411, 412, 391; 198/424; 242/56.4, 56.5

[56] References Cited

UNITED STATES PATENTS

| | | | |
|---|---|---|---|
| 1,941,992 | 1/1934 | Makenny | 221/93 |
| 2,313,500 | 3/1943 | Anderson | 221/93 X |
| 2,350,273 | 5/1944 | Decker | 214/6 M |
| 3,195,444 | 7/1965 | McLean | 214/8 |
| 3,246,799 | 4/1966 | Davis | 221/93 |
| 3,424,294 | 1/1969 | Felstehausen | 53/157 X |
| 3,545,632 | 12/1970 | Cooper | 214/8 |

*Primary Examiner*—L. J. Paperner
*Attorney, Agent, or Firm*—Kenway & Jenney

[57] ABSTRACT

A stacking and interleafing device for rolls of pressure sensitive adhesive tape has an inclined table adapted to hold a row of the rolls carried in a spaced relationship on a mandrel. The table supports a plurality of upright, parallel plates that separate the adjacent rolls. The plates maintain the rolls in a spaced apart relationship as the mandrel is drawn clear of the rolls and as they advance down the incline. An escapement mechanism mounted over the table successively transfers one row of stripped rolls from a storage portion of the table to a feeder portion of the table subtended by a movable drop-off mechanism. Translation of the drop-off mechanism gravity feeds the rolls, one at a time, and without contact between the rolls, to a conveyor system. A reciprocating shuttle plate receives the rolls from the conveyor system and successively carries each roll to a mandrel mounted on a rotatable stack forming arm. As the shuttle returns to receive another roll, the preceding roll drops onto the mandrel. Suction ports located on the underside of the shuttle strips a release liner from a supply magazine and carries it with the roll to the stacking mandrel. When the shuttle positions the roll and the release liner over the mandrel, a valve arrangement releases the vacuum and the release liner drops onto the mandrel thereby interleafing with the rolls as they are stacked. When a predetermined number of rolls are stacked and interleafed, the rotatable arm indexes to bring an empty mandrel in the stack forming or "load" position. At the same time, the stacked mandrel is carried to an "unload" position. A fork lift elevator and associated stack handling devices remove the stack from the mandrel in the unload position and convey it to a packer.

17 Claims, 7 Drawing Figures

APPARATUS AND METHOD FOR STACKING ROLLS OF PRESSURE SENSITIVE TAPE

BACKGROUND OF THE INVENTION

This invention relates in general to stacking and packaging devices and methods, and more specifically to a novel apparatus and method for automatically stacking rolls of pressure sensitive adhesive tape and interleafing them with a release liner so that the rolls will not adhere to one another when packaged.

In the manufacture of rolls of pressure sensitve adhesive tape, it is well known in the art to slit a web of adhesive coated material into numerous strips of lesser width. The strips are, simultaneous with slitting, wound into rolls of some suitable length of tape, each roll being formed on a separate core carried on a mandrel. As the sides of the rolls may themselves be tacky due to the adhesive which exudes from the roll convolutions, it is common to employ two parallel, spaced apart mandrels as described in U.S. Pat. No. 3,127,123 to Bowker et al., issued Mar. 31, 1964. Adjacent strips are directed from the slitter to different mandrels, thereby spacing the rolls of adhesive tape from one another on each of the mandrels by a distance equal to the width of a single roll. Thus, in the event adhesive is present on the face of the roll, the adhesive faces will not be in contact with one another.

The rolls are then removed from each mandrel and stacked together in some desired number in preparation for packaging. The standard technique is simply to slide or to push the rolls off the mandrel. This results in the rolls coming into face-to-face contact. Where there is an exudate of adhesive, the rolls adhere strongly to one another. As a result, the rolls must then be pried or pulled apart. Heretofore, this separation has been done by hand, usually with the aid of a knife or similar tool. Once separated, the rolls are then stacked by hand and interleafed with paper. These release papers are placed between the adjacent rolls in the stack to prevent them from again adhering to one another during storage in preparation for marketing.

These manual roll separation and stack formation processes have a major disadvantage in that they are extremely slow. In the overall production process, these steps are frequently the limiting factors on production speed. Further, the rolls are frequently damaged when they are pried apart. A common problem is "dishing" or "telescoping" where the inner convolutions of the rolls are pulled out of an overlying alignment with the outer convolutions. This problem is particularly acute in the production of rolls of pressure senitive tape having a width of ¼ inch or less. Still further, the use of sharp, hand-held knives and tools needed for separating adjacent rolls adhered together, presents a clear safety hazard.

It is therefore a principal object of this invention to provide an apparatus and method for automatically stacking and interleafing rolls of pressure sensitive adhesive tape initially carried in a spaced relationship on a mandrel whereby the rolls are prevented from adhering to one another.

Another object is to provide a stacking and interleafing apparatus and method that substantially increases production speed and reduces the manufacturing cost of pressure sensitive adhesive tape.

SUMMARY OF THE INVENTION

This invention provides an inclined table adapted to receive a mandrel carrying a row of spaced apart rolls of pressure sensitive adhesive tape. The table supports a plurality of upright, parallel, spaced apart plates aligned so that they are interposed between adjacent rolls carried on the mandrel. When the mandrel is extracted by a pulling motion transverse to the plates, the plates maintain the rolls in a spaced relationship. Once the rolls are stripped from the mandrel, they advance down the divider table in the channels defined by the "divider" plates until restrained by an escapement mechanism mounted over the table. Preferably the table has the capacity to store more than one row of rolls between the mandrel stripping area and the escapement, and therefore a row of stripped rolls may come to rest against the previously stripped row.

The escapement repeatedly transfers a single row of rolls to a feeder portion of the inclined stripper table extending along its lower edge and subtended by a movable drop-off mechanism or member. A translation of the mechanism in a direction substantially transverse to that of the plates allows the rolls to drop one at a time, and without contact with an adjacent roll, to an underlying conveyor system that transports the rolls to a stack forming apparatus.

A stack of the rolls is formed on a load mandrel mounted on a rotatable arm. A reciprocating shuttle plate receives the rolls from the conveyor system and repeatedly carries each roll to a position over the load mandrel. As the shuttle returns to receive the following roll from the conveyor system, a pivoted retainer carried on the upper end of the mandrel holds the roll over the mandrel until it clears the shuttle and drops onto the arm or a previously stacked roll. Suction ports formed on the underside of the shuttle strip a release liner from a supply magazine and carry it along with an overlying roll to the load mandrel. When the liner is positioned over the load mandrel, a valve releases the vacuum supply to the suction ports and allows the release liner to drop onto the load mandrel and interleaf the stacked rolls.

When the stack reaches a predetermined number of rolls, the rotatable arm indexes to introduce an empty mandrel to the load position and simultaneously carries a stacked mandrel to an unload position. A forked elevator, acting in phase with a sweep arm and an off-bear conveyor, transfers the stack from the unload mandrel to a packer.

This and other features and advantages of this invention will be more fully understood from the following detailed description to be read in conjunction with the accompanying drawings.

BREIF DESCRIPTION OF THE DRAWINGS

DETAILED DESCRIPTION OF THE PREFERRED EMBODIMENTS

Figure 1:
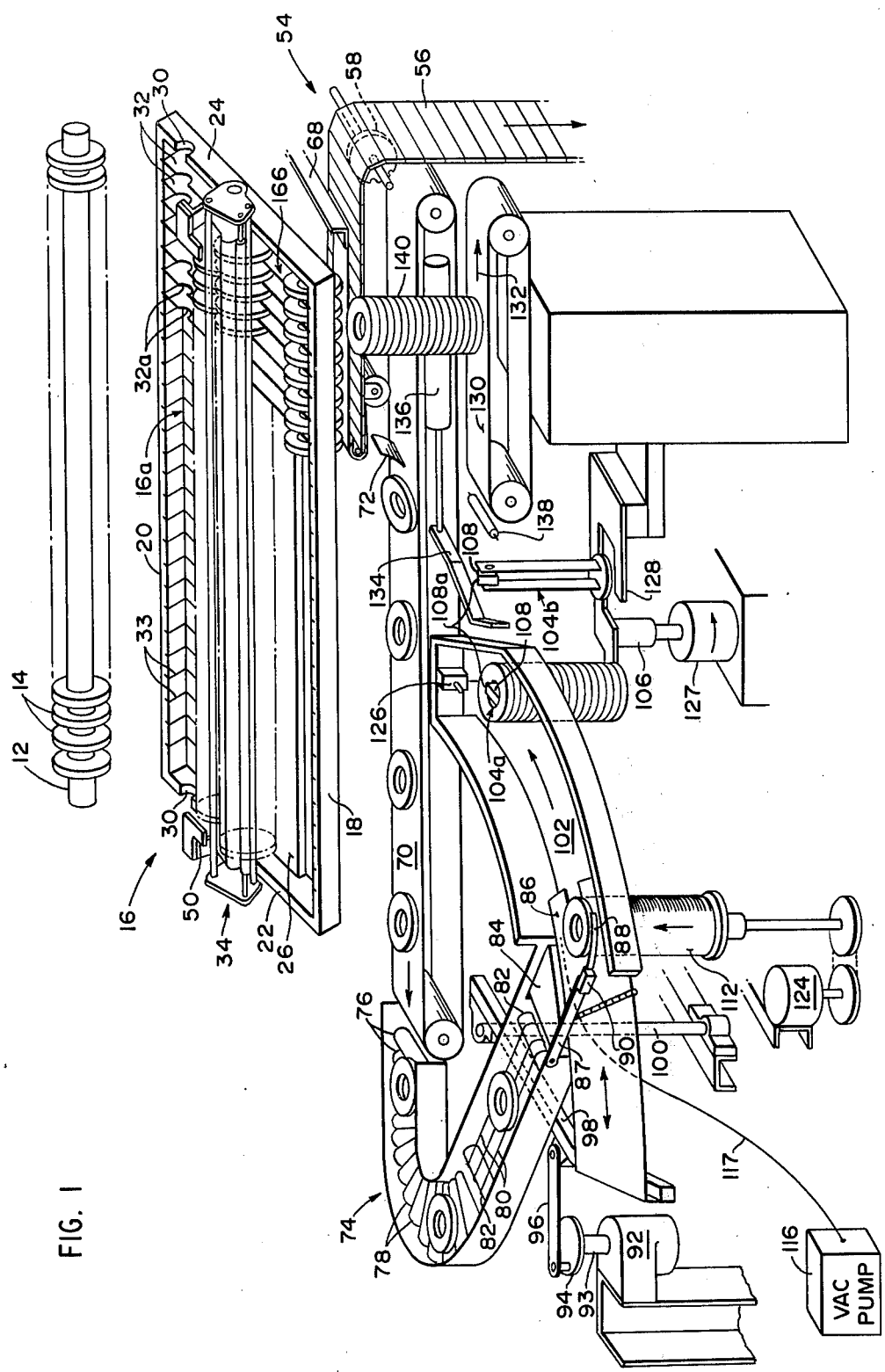
FIG. 1 is a simplified and exaggerated perspective view of a preferred embodiment of a stacking and interleafing apparatus constructed according to the invention.
Figure 2:
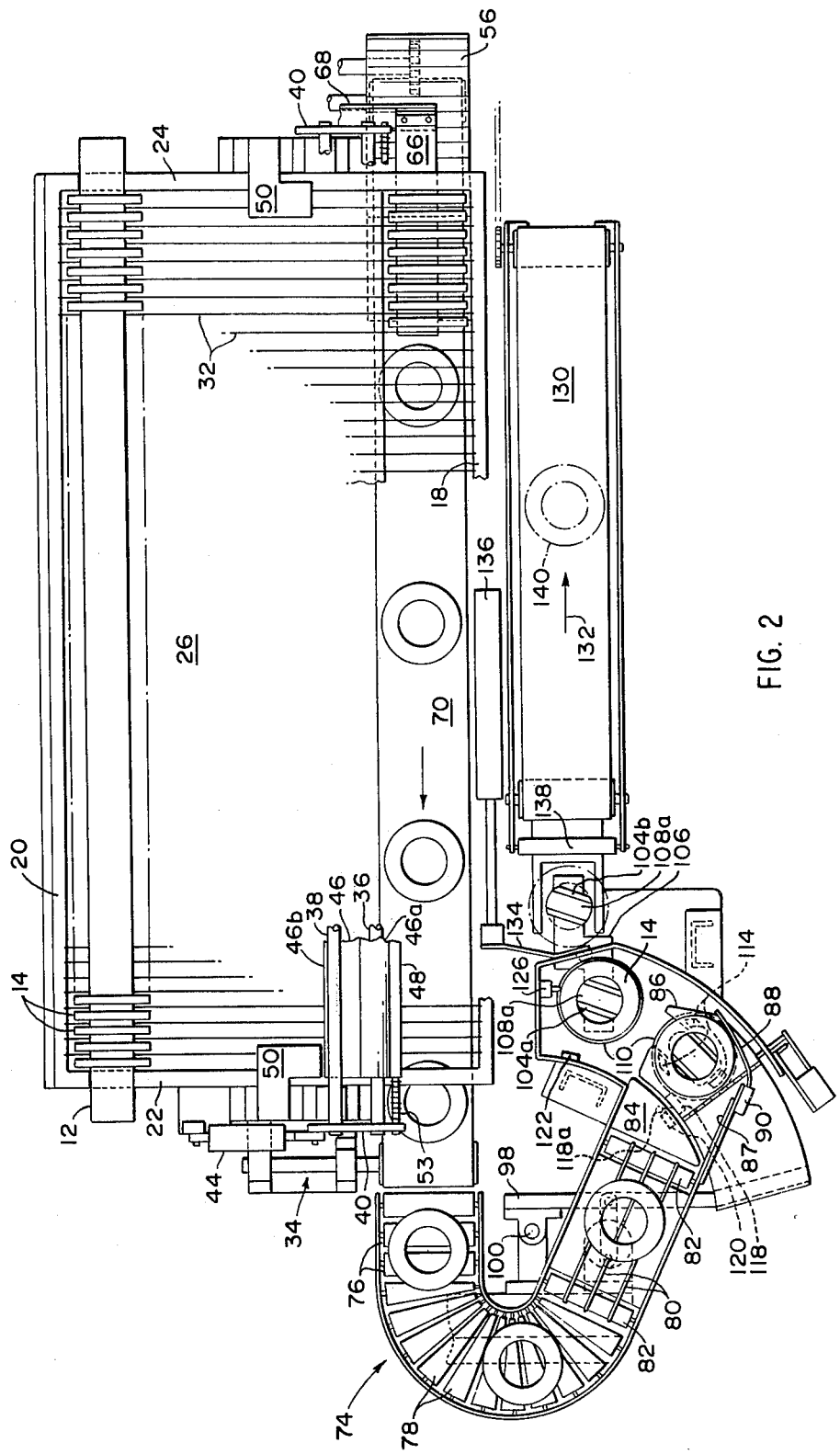
FIG. 2 is a top plan view of the apparatus shown in FIG. 1.

With reference to FIGS. 1 and 2, a mandrel 12 carries a row of rolls 14 of pressure sensitive adhesive tape that are spaced along the axis of the mandrel a distance equal to the width of a single roll. This is done so that adjacent rolls will not adhere to one another as the side faces of each roll typically carry adhesive material which has exuded from the roll convolutions.

The mandrel 12 is placed in an inclined table 16 having a generally rectangular shape defined by a lower frame member 18, an upper frame member 20 that is substantially parallel to the lower member 18, and a pair of substantially parallel side frame members 22 and 24 that extend between the members 18 and 20 along the axis of inclination of the table. The orientation of the mandrel 12 is generally transverse to the axis of inclination of the table. The table has a floor or base 26 that extends to the frame members 20, 22 and 24, but is spaced from the lower member 18. This open space 28 (FIG. 5), is defined by the frame member 18, the free edge of the base 26, and the portion of the side members 22 and 24 that extend between the member 18 and the free edge. The space 28 extends the full width of the table and extends along the axis of inclination for a distance at least equal to the maximum diameter of a roll 14 to allow the rolls to drop out of the table in a manner described in greater detail below.

The frame members 18 and 20 are long enough to include all of the rolls 14 carried on the mandrel 12 between the side frame members 22 and 24. The side members 22 and 24 are preferably long enough for the table 16 to hold at least four rows of rolls with the rolls resting on edge on the base 26 and adjacent rows in edge-to-edge tangential contact. The side members 22 and 24 each have an open, upwardly facing slot 30 adapted to hold an end of the mandrel 12 while removing the rolls therefrom. The slots 30 are spaced from the upper frame member 20 a sufficient distance to allow a small clearance between the rolls and the member 20 when the mandrel is cradled in the slots.

Supported by the table 16 are a plurality of substantially flat, upright plates or dividers 32, each having a generally rectangular shape, which divide the table into a number of inclined compartments depending on the number of rolls on the mandrel. The plates 32 extend from the lower frame 18 to the upper frame 20 with the ends of each plate being held in a suitable locating slot 33 formed on the inwardly facing surfaces of the members 18 and 20 and the upper surface of the base 26. Each plate 32 is substantially perpendicular to the members 18 and 22 and to base 26 and extends substantially along the axis of inclination of the table. The locating slots 33 are spaced and aligned so that the plates 32 are in a mutually parallel and spaced apart relationship with at least one plate 32 interposed between the adjacent faces of each roll pair carried on the mandrel 12. The upwardly facing edge of each plate 32 also has formed therein an open slot 32a similar to the slot 30 and adapted to receive the mandrel 12 when it is located in the slots 30. The plates 32, as well as the table 16, may be constructed from any suitable structural material such as metal, wood or plastic, but stainless steel or aluminum are preferred.

When the mandrel 12 rests in the slots 30, the plates or dividers 32 restrain the rolls from being drawn into face-to-face contact as the mandrel is drawn clear of the rolls by pulling or pushing it along its longitudinal axis. As the mandrel clears the core of each roll, the roll is free to advance down the inclined table under the influence of gravity towards the lower frame member 18. During this advance, the plates 32 guide the rolls and support them in the "on-edge" orientation with respect to base 26. It should be noted that although the angle of inclination of the table 16 (the angle between the floor 26 and the horizontal) is not critical, it should be sufficient to overcome the adhesive forces between the rolls and the table and/or the plates. An angle of inclination of approximately 10° has been found to be sufficient in most instances.

Figure 5:
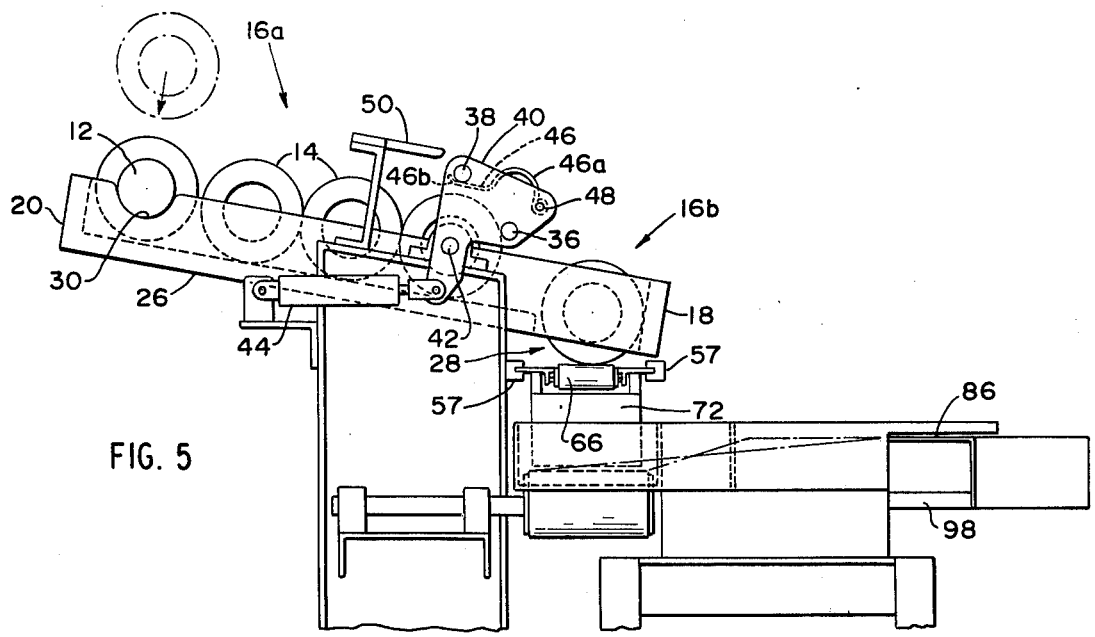
FIG. 5 is a view in side elevation, with portions broken away, of the apparatus shown in FIG. 1.
Figure 6:
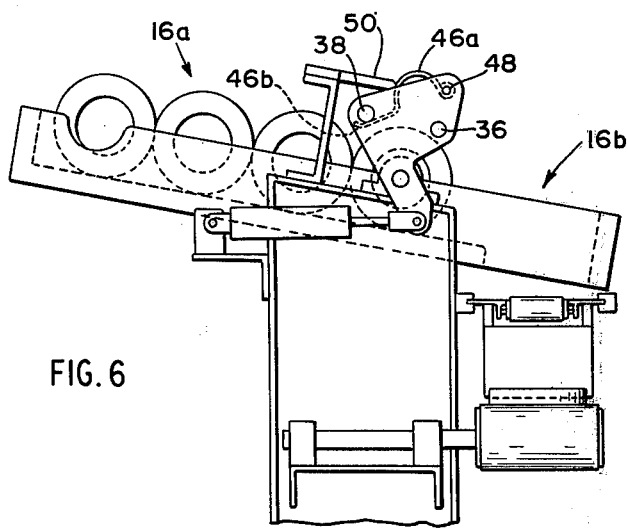
FIG. 6 is a view corresponding to FIG. 5 showing the escapement pivoting to advance a row of rolls.
Figure 7:
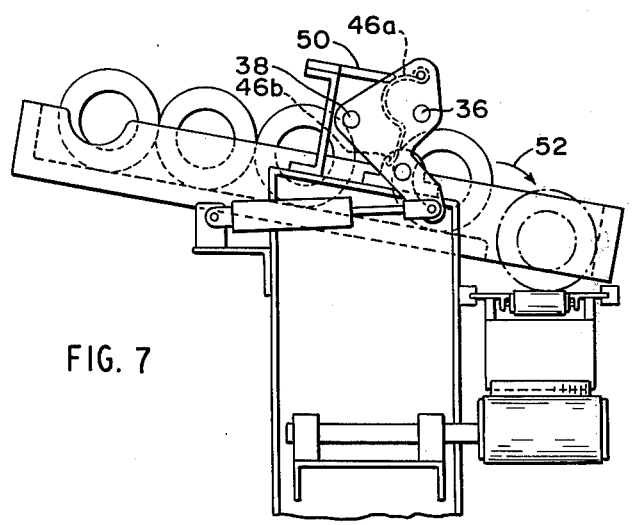
FIG. 7 is a view corresponding to FIG. 6 showing the escapement completely pivoted.

An escapement mechanism 34 mounted over the table 16 divides the table into an upper storage portion 16a subtended by the base 26, and a lower feeder portion 16b, corresponding to the open space 28, defined by the frame member 18, the lower portions of the side members 22 and 24 and the free edge of the base 26. With particular reference to FIGS. 5–7, the escapement 34 has a pair of parallel, spaced apart stop rods 36 and 38 carried between a pair of rocker arms 40 mounted on the table on a pivot pin 42. The lower stop rod 36 is positioned to restrain the downhill advance of the lowermost row of rolls (and indirectly any subsequntly stripped rows of rolls in the portion 16a) when the escapement is in its initial blocking position shown in FIG. 5. Periodically a hydraulic or air cylinder 44 rapidly pivots the escapement mechanism about the pin 42 from the blocking position, through the intermediate position shown in FIG. 6, to a row feed position shown in FIG. 7. In the feed position, the rear stop rod 38 restrains all of the rows of rolls in the storage portion 16a against a downward advance while the lowermost row of rolls, previously in contact with the stop rod 36, advances into the feeder portion 16b of the table. The rapidity of the pivoting movement and the position of the stop rod 38 on the rocker arms 40 are selected to ensure that the rod 38 does not crush or "footbal" the rods as it contacts them.

Since it was observed that exuding adhesive from a roll could occasionally prevent one or more rolls from advancing promptly into portion 16b of the table when the escapement 34 pivots, there is provided a blade 46, mounted to pivot about a rod 48 supported between the rocker arms 40, that sweeps or kicks the lowermost row of rolls into the feed area 16b. The sweeping motion is generated by curved portion 46a of the blade 46 camming against a fixed stop 50 secured to the side member 22 (compare FIGS. 6 and 7). The free edge 46b of the blade is positioned to drive the lowermost roll of rows in the table portions 16a into the portion 16b as indicated by the arrow 52 in FIG. 7. When the escapement pivots back to its initial position, a torsion spring 53, or an equivalent, pivots the blade 46 to its initial position. At the same time the rolls previously held against the rod 38 advance downwardly until restrained by the stop rod 36.

The feeder portion 16b is subtended by a movable drop-off mechanism or member 54 which can be best understood with reference to FIGS. 4–7. The drop-off mechanism 54 moves between a forward position in which it underlies all of the table portion 16b and a rear position in which it is completely clear of the table portion 16b. Movement of the drop-off mechanism between these positions, in a left to right direction as seen in FIG. 1, is coordinated with the action of the escapement mechanism 34 so that each time a row of rolls is transferred to the table portion 16b, the drop-off mechanism is in the forward position and the row of rolls are supported by the drop-off mechanism.

The drop-off mechanism 54 comprises a flat-top conveyor chain 56 having a series of links hinged together. The chain 56 tracks in a pair of grooved ways 57 (FIGS. 5-7) that engage the ends of each link over the region proximate the feeder portion 16b of the table. A gear 58, powered by a reversible hydraulic motor (not shown), propels the chain 56 between the forward and rear positions. The forward end of the chain 56 (the left end as illustred) supports an idler roller 62 oriented in a direction substantially transverse to the direction of movement of the chain. The chain also supports a spring loaded reel 64. A flexible strip 66 is looped over the idler 62 with one end wound on the spring loaded roll 64 and the other end secured to a fixed bar 68. The belt 66 is positioned so that the rolls in the feeder portion 16b rest on the belt 66 which remains stationary under each roll as the chain 56 translates, rather than making contact with the chain itself which moves relative to the rolls.

As the chain 56 moves from the forward position to the rear position, it successively clears the rolls resting on the belt 66 and these each in turn fall in a spaced relationship onto a conveyor belt 70 that underlies both the table portion 16b and the drop-off mechanism 54. The speed of movement of the drop-off mechanism relative to that of the conveyor 70 is such that the rolls are fed from the table portion 16b to the conveyor 35 without contact between any of the rolls. It should be noted that during the translation of the drop-off mechanism, the belt 66 winds onto the roller 64 so that there is no relative movement between the rolls and the belt. As the rolls fall, they strike a lip 72 which is suspended from the chain 56. The lip 72 has an end portion 72a angled in a direction oppoiste to the direction of movement of the escapement mechanism as it feeds the rolls, which imparts a stable horizontal orientation to the rolls as they land on the conveyor belt 70. It should be noted that the rolls carried on the conveyor 70 move in a direction oppoiste to that of the drop-off mechanism 54 as it moves from its forward to rear position.

As can be best seen in FIGS. 1 and 2, the conveyor belt 70 transfers the rolls to a horseshoe shaped turn-around 74 having an initial series of cylindrical rolls 76, a series of tapered rolls 78 that carry the rolls around the bottom of the horseshoe, and a final leg preferably formed by a set of parallel polyurethane bands 80 carried between a pair of cylindrical rolls 82. The rolls 76, 78 and 82 are all driven, preferably at rotational speed which convey the rolls at a generally constant linear speed. It should be noted that the ends of the horseshoe turn-around are at different levels, primarily to accommodate the components with varying vertical dimensions, while placing all of the apparatus at a level that is conveniently accessible to an operator or maintenance personnel. It should be also noted that the rolls and the bands 80 forming the turn-around 74 are inclined and-/or sloped transversely, a sufficient degree to avoid having any part of a roll lift off the turn-around a sufficient distance to allow a preceding or following roll to jam under the lifted portion.

As the rolls leave the horseshoe turn-around 74, they slide over an end plate 84 and come to rest on an upward facing surface of a shuttle plate 86. The speed at which the rolls leave the horseshoe turn-around can be adjusted to carry each roll onto the shuttle, or, more typically, the rolls back up, in tangential, edge-to-edge contact, from the shuttle 86, onto the turn-around 74 so that the turn-around continuosuly urges the rolls onto the shuttle. Each roll is guided along a fence 87 onto the shuttle until it strikes a microswitch actuator 88 located at the free end of the fence 87 facing the horseshoe turn-around. When the roll trips the actuator arm 88, it is automatically properly located on the shuttle 86.

When a roll trips the actuating actuator 88, the microswitch 90 energizes a hydraulic motor 92. Rotation of the motor shaft 93 and the connected wheel 94, acting through an eccentrically mounted crank arm 96, pivots the shuttle support arm 98 about an upright support shaft 100. A 180° rotation of the wheel 94 drives the shuttle from its initial roll receiving limit position (FIGS. 1 and 2), along a curved path in the direction of the arrow 102 (FIG. 1), to a stack forming limit position directly over an upright stack forming or load mandrel 104a of a rotatable arm 106. The arm 106 periodically rotates or indexes through 180° increments that carry the mandrel 104a to an unload position. A mandrel 104b, initially in the unload position is simultaneously carried into the load position.

The leading edge of the shuttle plate 86 has an open slot 86a which extends from the "leading" edge of the shuttle to a point beyond the core opening of the roll 14 carried on the shuttle plate. Because of the open slot 86a, as the shuttle carries the roll over the mandrel, the roll depresses the normally raised end 108a of a pivoted retainer member 108 mounted at the upper end of the mandrel 104a. When the central core opening of the roll 14 is positioned over the retainer member 108, the shuttle 86 has reached its extreme forward position and the end 108a returns to its normal raised position within the core. Continued rotation of the motor 92 and the wheel 94 then reverses the direction of the motion of the shuttle 86 bringing it back to its initial limit position to receive the following roll 14 from the turn-around 74. As the shuttle plate returns, the raised portion 108a prevents the roll 14 from also returning. When the shuttle plate clears the roll, the roll drops onto the mandrel 104a and is thus stacked. When the shuttle 86 is in its forward position (over the mandrel), a roll will be positioned against the fence 87 on the trailing surface of the shuttle 86. When the shuttle 86 returns to its back position the roll will then be in position for delivery to the mandrel.

During each movement from the initial roll receiving position to the mandrel 104a or 104b, the reciprocating shuttle plate 86 also carries a release liner 110 shaped in the form of an annulus. A release liner magazine 112 is located directly below the shuttle in its initial roll receiving position. The shuttle strips the top release annulus from the magazine and carries it to the load mandrel by means of suction ports 114 formed on the under side of the shuttle 86. A vacuum pump 116 generates the suction. The pump 116 is connected to the ports 114 through a vacuum line 117. The vacuum line 117 contains a valve 118 which is switched between an open and closed position by an operating arm 118a which is positioned to strike the fixed stops 120 and 122. As the shuttle returns to the roll receiving limit position, the stop 120 opens the valve 118 causing the ports 114 to strip the top release liner 110 from the magazine 112. The suction ports 114 grip the release liner until the stop 122, on forward movement of the shuttle, closes the valve 118 and opens the vacuum bleed causing the release liner to fall onto the load mandrel. As the supply of release liners in the magazine begins to diminish, suitable sensing means such as a pressure switch activates a hydraulic motor 124 which raises the entire supply of liners held in the magazine 112 so that the top most liner is proximate the ports 114 and readily stripped from the magazine. A limit switch is also provided which shuts down the entire apparatus whenever the release liner supply needs to be replenished.

The shuttle 86 will continue to stack roll and release liner pairs on the load mandrel until the stack formed on the mandrel reaches a predetermined number of rolls. In the illustrated embodiment of the invention, as each roll is carried over the load mandrel, it strikes a limit switch 126 which provides a signal to suitable counting device (not shown). When the count reaches a preselected number, corresponding to the desired number of rolls in each stack, a motor 127 is energized to index the rotatable arm and mandrels 106 through 180° and the mandrels 104a and 104b exchange positions. While the arm 106 indexes, a brief delay is preferably introduced into the activation control of the roll feeding and stack forming mechanisms described hereinabove.

Figure 3:
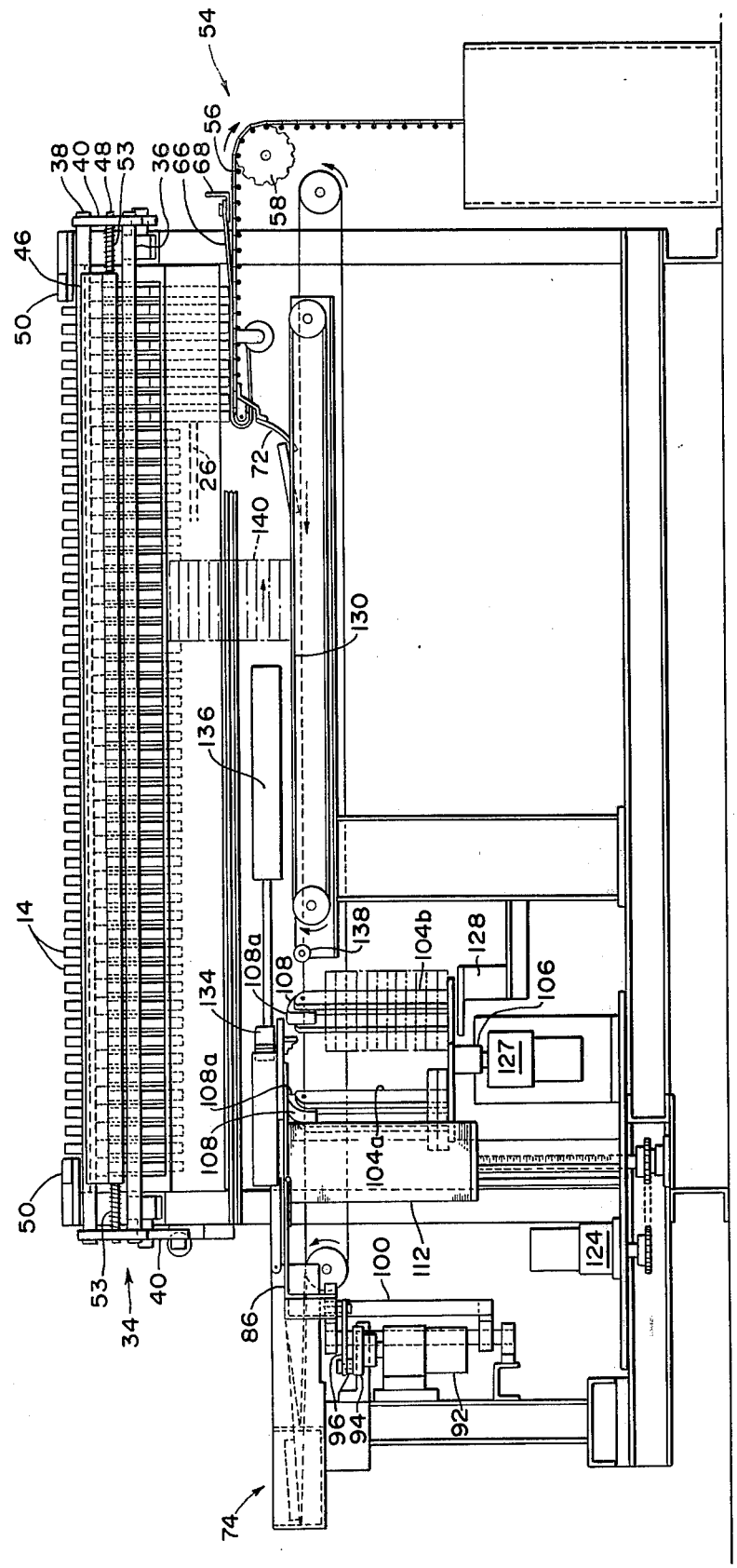
FIG. 3 is a view in front elevation of the apparatus shown in FIG. 1.
Figure 4:
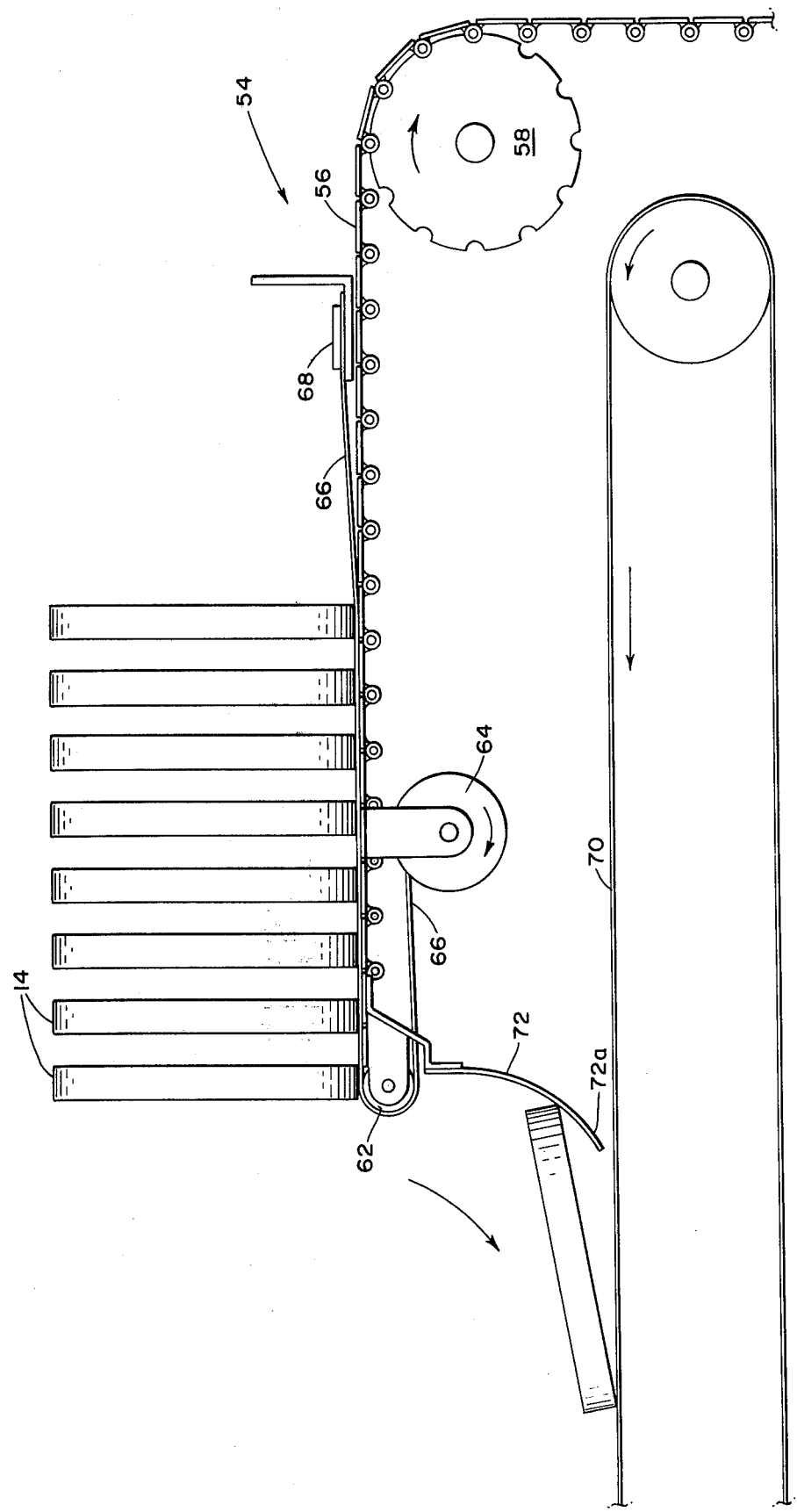
FIG. 4 is an enlarged view in front elevation of the drop-off mechanism shown in FIG. 1.

With the stacked mandrel 104a in the unload position, a forked elevator 128 is activated to lift the stack from the arm to the level of an off-bear conveyor belt 130 whose top run moves in the direction indicated by the arrow 132 (FIGS. 1 and 2). When the elevator 128 reaches its fully raised position, a sweep arm 134 activated by an air cylinder 136 draws the stack over an idler roller 138 (FIGS. 2 and 3) and onto the conveyor 130. The idler roller 138 stabilizes the stack during the transfer. The off-bear conveyor 130, which may operate continuously or intermittently, carries a stack 140 (FIGS. 1-3) of rolls, to a packer who usually encloses the stack in a plastic bag and places it in a shipping carton.

In a typical production operation, a large supply web of adhesive coated material 55 inches in width is slit into narrow strips, ¼ inch to 2 inches in width. The narrow strips are then wound on cores carried on a mandrel 12, with alternate strips being directed to another mandrel. The rolls on each mandrel are therefore spaced by the width of the tape being wound. Typical dimensions for a roll of tape are a core inside diameter of 3 inches and an outer diameter of 4 to 6⅛ inches. When the rolls are wound, each mandrel 12 is transferred in turn to the inclined table 16 and placed in the slots 30 and 32a. At least one divider plate 32 separates each adjacent pair of rolls carried on the mandrel. The plates 32 are adjustably spaced by varying their number and/or location to accommodate rolls of varying width. For this purpose, the locating slots 33 are spaced at convenient intervals, such as every ¼ inch. To strip the rolls, the mandrel is simply pulled or pushed along its longtiudinal axis. As the mandrel successively clears each roll, they advance down the table until they strike the escapement stop rod 36 or a previously stripped roll. The stripping process can be repeated indefinitely as long as there is room in the table portion 16a for another row of rolls.

Automatic mechanical operations on the rolls begin with the pivoting of the escapement mechanism 34 to feed the lowermost row of rolls in the storage portion 16a to the feeder portion 16b. The row of rolls thus fed comes to rest on the flexible belt 66 of the drop-off mechanism 54 which is initially in its forward limit position. The drop-off mechanism then begins to move to its rear position which successively gravity feeds the rolls, one at a time and without contact between any of the rolls, to the underlying conveyor 70. After all of the rolls in the feed portion 16b have been fed to the conveyor 70, the drop-off mechanism quickly returns to its forward limit position and the escapement again pivots to refill the feeder portion with another row of rolls. The return speed of the drop-off mechanism, however, does not exceed that of the conveyor to prevent the lip 72 from pushing together the rolls remaining on the conveyor.

The conveyor 70 and the turn-around 74 carry the rolls to the shuttle plate 86. Each roll 14 advances onto the shuttle guided by the fence 87 and the actuator 88, until it trips the microswitch. This initiates a reciprocation of the shuttle to a forward limit point directly over one of the stack forming mandrels 104a or 104b and back to the initial position. As the shuttle 86 carries each roll 14 to a stack forming mandrel, it also carries release liner 110 which drops over the stack forming mandrel to interleaf the adjacent rolls in the stack. The first release liner is automatically deleted from each stack of rolls being formed on the mandrel. This is done because since otherwise it would be lost during stack removal. When the stack contains a predetermined number of rolls, the mandrels 104a and 104b exchange positions to introduce an empty mandrel to the stack forming or load position and place the stacked mandrel in a stack removal or unload position. The stack unloading operation begins with the fork elevator 128 raising the stack clear of the mandrel. The sweep arm 134 then transfers the stack to the off-bear conveyor 130. The elevator then lowers to its original position. During the stack removal operation, the shuttle continues to stack and interleaf rolls on the mandrel in the load position. Typically the apparatus described hereinabove can stack and interleaf rolls of pressure sensitive tape, without contact between the faces of the rolls, at a rate of 1 to 2 rolls per second.

Although the above detailed description has been directed to the preferred embodiment of the invention, various alternative arrangements can be employed to perform the operations described above, and such arrangements are intended to fall within the scope of the invention. For example, the table 16 can have a two row capacity, a mandrel stripping position and a feed position, or only a one row capacity, with the stripping function performed directly in the feeding area with the rolls resting on the drop-off mechanism. These arrangements have the obvious disadvantage of a slower rate of operation. It is also contemplated that the plates can assume a wide variety of shapesprovided that they perform the necessary separation function. Further, it is contemplated that the plates can be carried by a supporting structure other than the table 16, provided they interpose the adjacent rolls held on the table.

The advancement of the rolls in the table 16 can be accomplished by non-gravitational means such as underlying conveyor belts or compressed air jets, and in that event the table 16 may not require an inclination from the horizontal. Further, it is contemplated that those skilled in the art can devise various alternative escapement devices to control the movement of the rolls on the table.

Similarly the drop-off mechanism can assume a variety of forms. In a more highly simplified form, the drop-off mechanism can consist of a single sheet of a flexible structural material such as stainless steel with the rolls resting directly on the sheet. This arrangement, however has the disadvantage of drawing the rolls sideways, in the direction of movement of the sheet, which can cause the rolls to "hang up" in the feeder portion due to and adhesion between the roll face and the plate 32.

The stack forming mechanisms can also assume a variety of forms. One arrangement involves a stack forming mandrel with a plurality of radially extending stack forming arms which rotate in a vertical plane, in succession, through a roll load position and a stack unload position. Using this type of stack forming mandrel, the rolls can be tossed onto the load arm by a flipper plate which serially receives the rolls from the conveyor system. A photorelay triggered by a roll seating on the flipper plate has been found suitable for controlling the movement of the flipper plate. In contrast to the simultaneous interleafing described hereinabove, the release liners can be fed alternately with the flipper plate or its equivalent. One arrangement employs a roller to strip the release liners from the magazine and direct them through a chute to the load arm. Another arrangement utilizes a vacuum system with suction pick-up heads carried on the ends of a plurality of radially extending arms. The heads successively rotate to a supply magazine where they strip away a release liner, and a position over the stack forming or load arm where they release the liner. It should be noted that the rotatable arm 106 can carry more than two mandrels 104 provided that the necessary alterations are made in the location of the neighboring and/or associated mechanisms, and the mandrel index angle is correspondingly adjusted.

These and other modifications will become apparent to those skilled in the art from the foregoing description and accompanying drawings. Such modifications are intended to fall within the scope of the appended claims.

What is claimed is:

1. Apparatus for handling annular rolls of pressure sensitive tape with adhesive-bearing faces, comprising, in combination,
   a mandrel that supports a plurality of said rolls in spaced relation, said mandrel passing through apertured portions of said rolls,
   support means for supporting said mandrel and rolls with said mandrel extending generally horizontally and overlying said support means,
   roll separation means operable to prevent contact between said rolls when said mandrel is withdrawn from said apertured roll portions,
   receiving conveyor means disposed generally beneath said support means, and
   sequentially operable roll discharge means underlying said support means and operable to sequentially and individually discharge said rolls onto said receiving conveyor means in mutually spaced relation, and continuously maintain said spaced relation between said rolls as said rolls are individually and sequentially discharged.

2. Apparatus according to claim 1 in which said roll separation means comprises a plurality of spaced apart, substantially parallel plates that separate the opposed, adhesive-bearing faces of adjacent rolls.

3. Apparatus according to claim 2 in which said support means includes a table that supports said mandrel, said rolls and said plates, said table being inclined at an acute angle with respect to the horizontal, and said plates being aligned along the axis of inclination of said table and generally perpendicular to said mandrel.

4. Apparatus for handling rolls of pressure sensitive tape that are initially carried on a mandrel in a spaced relationship, comprising, in combination,
   a plurality of spaced apart, substantially parallel plates that separate the opposed faces of adjacent rolls when the mandrel is withdrawn from the rolls,
   a table that supports said plates, said table having a roll feeder portion that holds a row of the rolls, and
   a drop off mechanism that subtends said feeder portion and is movable between a first position in which it supports all of the rolls in said feeder portion and a second position in which it is clear of said feeder portion.

5. Apparatus for stacking rolls of pressure sensitive tape with the rolls interleafed with release liners, said rolls being introduced to the apparatus carried on a mandrel in a spaced relationship, comprising, in combination,
   means for maintaining the rolls in said spaced relationship as the mandrel in withdrawn from the rolls and storing the rolls thus stripped in said spaced relationship,
   means for forming stacks of said rolls and placing a release liner between the adjacent faces of the rolls in each of said stacks,
   means for successively transferring each roll from said roll spacing means to said stacking forming means without contact between the faces of the rolls, and
   means for removing each stack from said stack forming means when it has a predetermined number of rolls.

6. Apparatus according to claim 5 in which said roll spacing means comprises a plurality of spaced apart, substantially parallel plates that separate the opposed faces of adjacent rolls.

7. Apparatus according to claim 6 in which said roll spacing means further comprises a table that supports said plates, said table being inclined at an acute angle with respect to the horizontal and each of said plates being aligned along the axis of inclination of the table.

8. Apparatus according to claim 7 in which said table is inclined at an acute angle with respect to the horizontal and each of said plates is aligned along the axis of inclination of said table.

9. Apparatus for stacking rolls of pressure sensitive tape with the rolls interleafed with release liners, said rolls being introduced to the apparatus carried on a mandrel in a spaced relationship, comprising, in combination,
   a table inclined at an acute angle with respect to the horizontal,
   a plurality of spaced apart, substantially parallel plates mounted on the upward facing surface of said table and aligned substantially along the axis of inclination of said table, said plates being interposed between the opposed faces of adjacent rolls, feeder means for successively removing the rolls from said table without contact between any of the rolls, means for forming the rolls thus removed from said table into a stack with one of said release liners interleafed between adjacent rolls in th stack, and means for removing the stack from said stack forming means when it has a predetermined number of rolls.

10. Stacking apparatus according to claim 9 in which said inclined table has a storage portion adapted to hold at least one row of said rolls extending in a second direction transverse to said axis of inclination and a lower feeder portion having a capacity to hold one row of said rolls extending in said second direction.

11. Stacking apparatus according to claim 10 in which said feeder means comprises, means for successively transferring one row of said rolls from said upper table portion to said lower table portion, a drop-off mechanism that subtends said lower table portion and is movable in said second direction between a first position in which it supports all of the rolls in said lower feeder portion and a second position in which it is clear of said lower feeder position, and conveyor means that receives the rolls from said lower feeder portion as said drop-off mechanism moves from said first position to said second position.

12. Stacking apparatus according to claim 9 in which said stack forming means comprises a rotatable arm having a plurality of mandrels that each index in succession between load and unload positions, means for placing the rolls removed from said table on said load mandrel without contact between the faces of any of the rolls, and means for placing release liners on said load mandrel to interleaf adjacent rolls thus placed on said load mandrel.

13. Stacking apparatus according to claim 12 in which said stack removal means comprises means for sensing when the rolls placed on said load mandrel reaches a predetermined number, means responsive to said sensing means for indexing said arm and means for removing a stack of said predetermined number of rolls from said mandrel in the unload position.

14. Apparatus for stacking rolls of pressure sensitive adhesive tape with adjacent rolls in the stack interleafed with a release liner, said rolls being introduced to the apparatus carried on a mandrel in a spaced relationship, comprising, in combination, a generally rectangular table inclined about a first side thereof to form an acute angle with the horizontal, said table having an upper storage portion adjacent to a second side thereof parallel to said first side and a lower feeder portion adjacent to said first side, said first and second sides extending in a first direction, a plurality of upright, spaced apart, mutually parallel plates mounted on the generally upward facing surface of said table and extending from said first side to said second side in a second direction substantially perpendicular to said first direction, and said table and said plates having a row of open, upwardly facing slots adapted to receive the mandrel with said plates separating the faces of the adjacent rolls held on the table, kj escapement means for repeatedly transferring a row of rolls from said upper storage portion to said lower feeder portion, said lower feeder portion having a capacity to hold one row of said rolls, a drop-off mechanism subtending said lower feeder portion, said mechanism being movable along said first direction to successively gravity feed rolls from said lower feeder portion without contact between any of the rolls, first conveyor means having a conveyor belt portion aligned parallel to and below said drop-off member to receive the rolls fed from said lower feeder portion by the movement of said drop-off member, a shuttle plate having at least one suction port formed on its lower surface, said shuttle reciprocating between a first roll receiving limit position and a second roll release limit position, a rotatable stack forming arm having a plurality of upright stack forming mandrels that index in succession through a load position and an unload position, means for retaining each roll carried on the shuttle at said second position as said shuttle moves from said second position to said first position, a supply of release liners aligned vertically below said shuttle in its first position so that said suction port strips the top release liner from said supply, a vacuum source in fluid communication with said suction port, control means for applying said vacuum to said suction ports when said shuttle is in said firstj position and maintaining said vacuum as said shuttle reciprocates from said first position to said second position, and for terminating said vacuum when said shuttle is in said second position to drop said release liner onto said mandrel in said load position, and means for removing a stack of interleafed rolls from said stack forming mandrel in the stack removal position when the stack has a predetermined number or rolls.

15. Apparatus according to claim 14 in which said roll retaining means comprises a pivoted retainer member having a raised end portion that is depressed by said roll and release sheet as they approach said second position and raises when said shuttle, said roll, and said release liner reach said second position.

16. Apparatus according to claim 14 in which said stack removal means further comprises means for sensing when the rolls placed on said load mandrel reaches a predetermined number, means responsive to said sensing means for indexing said arm, and means for removing a stack of said predetermined number of rolls from said mandrel in the unload position.

17. Apparatus according to claim 14 wherein said escapement means has a kick blade extending across said table in said first direction that propels a row of rolls from said upper storage portion to said lower feeder portion.

* * * * *

UNITED STATES PATENT AND TRADEMARK OFFICE
CERTIFICATE OF CORRECTION

PATENT NO. : 4,030,619
DATED : June 21, 1977
INVENTOR(S) : Ernest C. Hiscoe

It is certified that error appears in the above-identified patent and that said Letters Patent are hereby corrected as shown below:

Column 1, line 12, "sensitve" should be --sensitive--;

Column 1, line 14, "numberous" should be --numerous--;

Column 1, line 53, "senitive" should be --sensitive--;

Column 4, line 45, "footbal" should be --football--;

Column 5, line 17, "illustred" should be --illustrated--;

Column 5, line 42, "oppoiste" should be --opposite--;

Column 5, line 47, "oppoiste" should be --opposite--;

Column 6, line 8, "continuosuly" should be --continuously--;

Column 7, line 42, after "rolls" insert --or a number of stacks of rolls,--;

Column 7, line 63, "longtiudinal" should be --longitudinal--;

Column 8, line 59, "shapesprovided" should be --shapes provided--;

Column 9, line 12, "and" should be --an--;

Column 9, line 40, "corresponingly" should be --correspondingly--;

Column 11, line 6, "th" should be --the--;

UNITED STATES PATENT AND TRADEMARK OFFICE
CERTIFICATE OF CORRECTION

PATENT NO. : 4,030,619
DATED : June 21, 1977
INVENTOR(S) : Ernest C. Hiscoe

It is certified that error appears in the above-identified patent and that said Letters Patent are hereby corrected as shown below:

Column 11, line 11, after "a" should be --an upper--;

Column 12, line 3, after "table," delete "kj";

Column 12, line 34, "firstj" should be --first--.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*